United States Patent [19]

Ueda et al.

[11] Patent Number: 5,618,497

[45] Date of Patent: Apr. 8, 1997

[54] POLYMERIZATION APPARATUS EFFECTIVE IN PREVENTING POLYMER SCALE DEPOSITION

[75] Inventors: Takuya Ueda, Machida; Yoshihiro Shirota, Maebashi; Yoshihiko Hirai, Hasaki-machi; Toshiaki Maruyama, Sakura; Tadashi Amano, Kamisu-machi, all of Japan

[73] Assignee: Shin-Etsu Chemical Co., Ltd., Tokyo, Japan

[21] Appl. No.: 415,984

[22] Filed: Apr. 4, 1995

Related U.S. Application Data

[62] Division of Ser. No. 193,866, Feb. 9, 1994, Pat. No. 5,447, 999.

[30] Foreign Application Priority Data

Dec. 28, 1993 [JP] Japan .................................... 5-352184

[51] Int. Cl.$^6$ .................................... C08F 2/16; F28B 9/08
[52] U.S. Cl. ............................ 422/138; 165/111; 165/113
[58] Field of Search ............................ 165/111, 111 DC, 165/113; 422/138

[56] References Cited

U.S. PATENT DOCUMENTS

| | | | |
|---|---|---|---|
| 503,586 | 8/1893 | DuPont | 165/113 |
| 3,867,260 | 2/1975 | Freedman et al. | 165/111 |
| 4,408,024 | 10/1983 | Matsuyama et al. | 422/138 |
| 5,393,498 | 2/1995 | Lieberam | 422/138 |
| 5,456,888 | 10/1995 | Gilson et al. | 422/138 |

FOREIGN PATENT DOCUMENTS 1100484  6/1984  U.S.S.R. .

*Primary Examiner*—Thomas R. Weber
*Attorney, Agent, or Firm*—Oblon, Spivak, McClelland, Maier & Neustadt, P.C.

[57] ABSTRACT

A polymerization apparatus, comprises a polymerization vessel, a reflux condenser installed outside the polymerization vessel and a pipe connected between the reflux condenser and a wall of the polymerization vessel with an end thereof opening into a gaseous phase region inside the polymerization vessel, for returning the liquid condensate to the polymerization vessel, wherein said end projects from an inner surface of the wall of the polymerization vessel into the gaseous phase region. In polymerizing a monomer having an ethylenically unsaturated double bond using the polymerization apparatus, the quantity of heat removed by the reflux condenser is increased stepwise or continuously with progress of the polymerization, such that not less than 20% of the total reaction heat generated during the whole course of the polymerization is removed by the reflux condenser. With 100 or more repeated polymerization runs, polymer scale deposition inside the vessel is minimal even below the pipe end.

4 Claims, 1 Drawing Sheet ic double bond, and a process of produc-
POLYMERIZATION APPARATUS EFFECTIVE IN PREVENTING POLYMER SCALE DEPOSITION This is a Division, of application Ser. No. 08/193,866 filed on Feb. 9, 1994, now U.S. Pat. No. 5,447,999.

BACKGROUND OF THE INVENTION

1. Field of the Invention

The present invention relates to a polymerization apparatus useful for polymerizing a monomer having an ethylenically unsaturated double bond, and a process of producing a polymer using the same.

2. Description of the Prior Art

In suspension polymerization of a monomer having an ethylenically unsaturated double bond such as, for example vinyl chloride in an aqueous medium, water, a monomer, a polymerization initiator, a dispersant, and optionally other various additives are normally charged through pipes into a polymerization vessel, after which the polymerization reaction is initiated. In order to maintain the reaction system at a prescribed temperature during the polymerization reaction, heat of polymerization is removed by passing cooling water through a water jacket and optionally, through a reflux condenser, a baffle and a coil provided for the vessel.

With the polymerization of vinyl chloride or the like, there is a problem in that polymer scale is liable to be deposited in the polymerization vessel. A conventional method of preventing the polymer scale deposition, involves forming on the inner wall of the polymerization vessel and other parts with which the monomer comes into contact during the polymerization, a coating film of a polymer scale preventive agent such as a dyestuff, a pigment, a water-soluble polymer, a nitrite, a nitrogen-containing aromatic compound, a heterocyclic compound, an iodine compound, a pyrogallol derivative, a phenolic compound or an aromatic amine compound. Such an agent is known from publications described later.

In recent years, from the viewpoint of labor hygiene and environmental safeguards, efforts have been made to reduce as much as possible the frequency of opening the polymerization vessel for internal inspection or cleaning. An effective process is thus required that can prevent the deposition and growth of polymer scale in the polymerization vessel, over a long-term operation involving the repetition of about 100 or more batches of polymerization runs.

However, if such a long-term operation as described above is carried out with only the coating of the polymer scale preventive agent, polymer scale is still able to grow on the inner wall of the polymerization vessel and the like. This causes a problem in that the polymer scale may peel off from the internal wall and mix with a polymeric product being produced, causing an increase in fish eyes in the resultant polymeric products and a reduction in the quality thereof.

In recent years, in order to improve productivity, polymerization vessels have been made larger in size. Consequently, the proportion of heat removed by the water jacket is reduced with an ever increasing amount of heat being removed by the reflux condenser. Thus, for a polymerization vessel having an internal volume of 40 $m^3$ or more, and more particularly for one of 80 $m^3$ or more, heat removal by the reflux condenser has become indispensable.

The reflux condenser is installed outside the polymerization vessel, and a monomer condensed in the condenser is returned to the polymerization vessel through a pipe (hereafter referred to as a liquid-return pipe) which opens at one end into the gaseous phase region inside the polymerization vessel. The end of the liquid-return pipe is worked so as to be virtually flush with the inner wall of the polymerization vessel, with the result that when the liquid monomer refluxed from the reflux condenser flows out the end of the liquid-return pipe, it normally attaches to the inner wall surface and flows down into the reaction mixture. In a polymerization vessel with an internal volume of 40 $m^3$ or more, the volume of monomer which is condensed in the reflux condenser and refluxed to the polymerization vessel increases with an increase in the quantity of heat removed by the reflux condenser. In such a situation, even though a polymer scale preventive agent is coated on the inner wall surface of the polymerization vessel, it is difficult to prevent a build up in polymer scale on the surface, particularly in the area below the opening of the liquid-return pipe where a strip like deposit tends to form on the inner wall surface. Once polymer scale has deposited on the coating film of the polymer scale preventive agent, the polymer scale prevention effect thereof is impaired.

In addition to the liquid-return pipe from the reflux condenser, various other pipes including a pipe for changing raw materials and a pipe for recovering unreacted monomer gases are normally connected from the outside to open into the gaseous phase region inside the polymerization vessel. The monomer gas also enters into these pipes during polymerization, condensing into a liquid on the inner walls thereof, and flowing back from the pipe openings into the polymerization vessel. Since the pipe openings are similarly formed flush with the vessel wall as with the liquid-return pipe, polymer scale also tends to be deposited on the wall areas below the openings.

SUMMARY OF THE INVENTION

An object of the present invention is to provide a polymerization apparatus comprising a polymerization vessel and a reflux condenser, and in which polymer scale is not liable to be deposited on an area of an internal wall of the vessel below an opening of a liquid-return pipe from the reflux condenser even with long-term operation involving repeated polymerization of about 100 or more batches, and a process of producing a polymer with a high quality using the polymerization apparatus.

As a means to achieve the above object, the present invention provides a polymerization apparatus for polymerizing a monomer to produce a polymeric compound, comprising a polymerization vessel, a reflux condenser installed outside the polymerization vessel for removing heat by condensing a gaseous part of the monomer to form a liquid condensate, and a pipe connected between the reflux condenser and a wall of the polymerization vessel with an end thereof opening into a gaseous phase region inside the polymerization vessel, for returning the liquid condensate to the polymerization vessel, wherein said end projects from an inner surface of the wall of the polymerization vessel into the gaseous phase region.

Use of the polymerization apparatus and process of the present invention, in polymerizing a monomer having an ethylenic double bond, makes it possible to effectively prevent the deposition and growth of polymer scale on the wall of the polymerization vessel, particularly, on the area below the opening of the liquid-return pipe from the reflux condenser, even with long-term operation involving about 100 or more batches of polymerization runs. Consequently, it is possible to produce a high quality polymer with minimal fish eyes and at a high productivity.

DETAILED DESCRIPTION OF PREFERRED EMBODIMENTS

Figure 1:
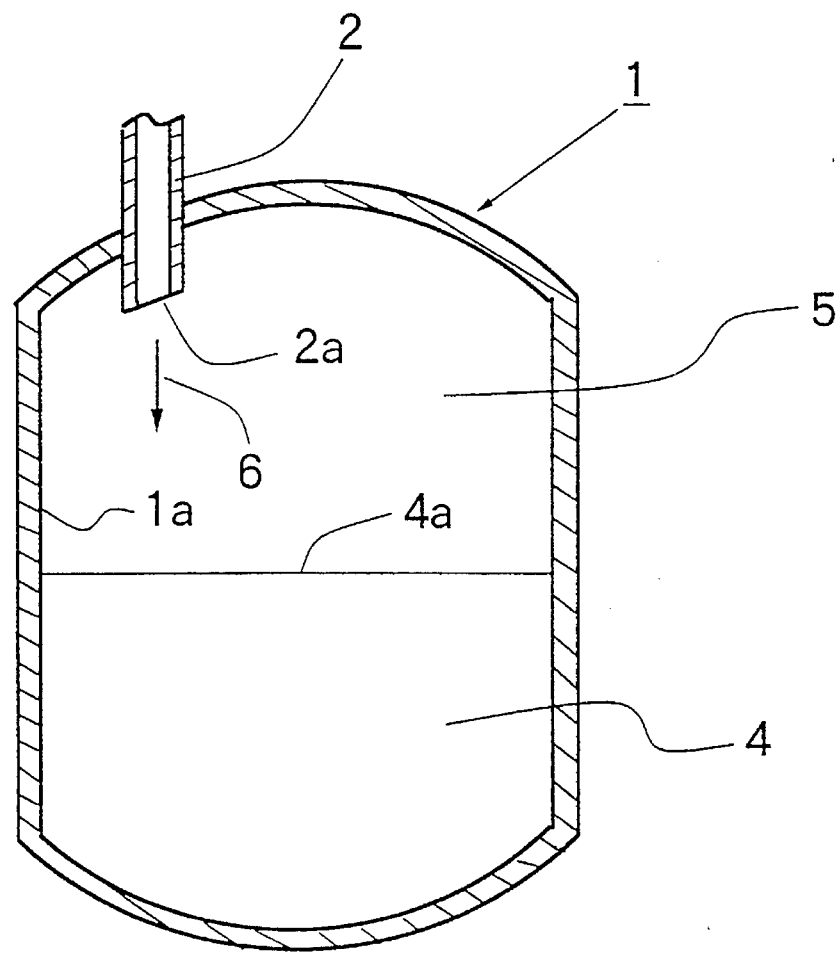
FIG. 1 is schematic longitudinal cross-section of a polymerization vessel used in the present invention.

With reference to FIG. 1, an embodiment of the present invention will now be described. FIG. 1 is a schematic longitudinal section showing a structure of a polymerization vessel 1 of the present invention. In FIG. 1, an end 2a of a liquid-return pipe 2 from a reflux condenser (not illustrated) projects from an inner wall surface 1a of the polymerization vessel 1 to open into a gaseous phase region 5 thereof. Accordingly, condensate which has flowed down from the reflux condenser drops from the end 2a, in a direction indicated by arrow 6, without directly contacting the inner wall 1a of the polymerization vessel 1, to reach a liquid level 4a of a reaction mixture 4. Consequently, polymer scale is neither deposited nor able to grow on the inner wall 1a. Hence, in the case where a coating film comprising a polymer scale preventive agent is formed on the surface of the inner wall 1a of the polymerization vessel 1, the effect of the coating film is not impaired even with a long-term operation involving repeated polymerization runs. Polymer scale is thus prevented from being deposited and growing on the surface.

In a preferred embodiment of the present invention, the polymerization apparatus has at least one pipe, other than the liquid-return pipe mentioned above, connected to the gaseous phase region part of the polymerization vessel, with an end thereof opening into the gaseous phase region and also projecting from the inner wall surface of the polymerization vessel into the gaseous phase region in a similar manner to the liquid-return pipe described above. Preferably, all such ends of other pipes project from the inner wall surface of the polymerization vessel into the gaseous phase region thereof. Such other pipes may be a pipe for charging various raw materials, a pipe for recovering unreacted monomer gas, a pipe for introducing water for washing the inside of the polymerization vessel, a pipe for coating a polymer scale preventive agent, a pipe for a safety valve, a pipe for introducing a polymerization inhibitor in the case of emergency shutdown, and the like.

In the present polymerization vessel, pipes communicating with the gaseous phase region of the polymerization vessel, project to an extent such that the condensate does not flow down on the inner wall surface of the polymerization vessel, normally projecting by not less than 1 cm, and preferably by 1 cm to 10 cm, into the gaseous phase region of the polymerization vessel.

There are no particular limitations on the shape of the projecting pipe end. For example, the pipe end may be cut obliquely so that liquid can readily drop therefrom.

To make the pipe project into the gaseous phase region of the polymerization vessel, the pipe may be installed so as to penetrate the polymerization vessel wall. Alternatively, in order to make use of a conventional polymerization vessel in which the end of the liquid-return pipe is formed flush with the surface of the inner wall thereof, a short pipe-shaped spout may be fixed to the end of the pipe.

Figure 2:
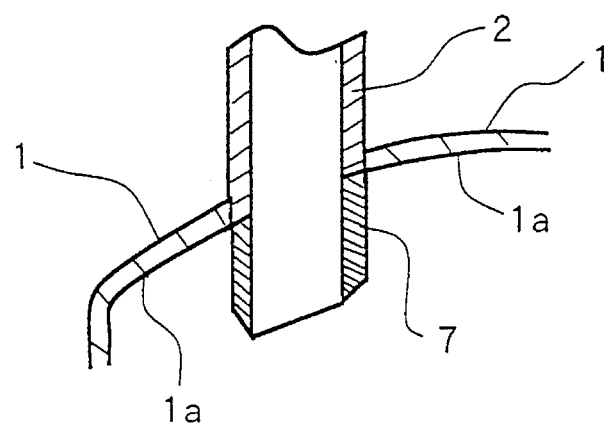
FIG. 2 is a schematic cross-sectional view of a part of a conventional polymerization vessel showing a pipe-shaped spout fixed to an end of a pipe communicating with a gaseous phase region of the vessel.

FIG. 2 is a view schematically illustrating a pipe-shaped spout 7 provided for a conventional polymerization vessel, in which the pipe-shaped spout 7 is attached to the end of a pipe 2 leading to the gaseous phase region 5. The end of the pipe 2 is formed flush with the surface of the inner wall 1a, and the spout 7 is attached thereto. To prevent the condensate which has flowed down the pipe 2, from remaining at the end of the spout 7, and to facilitate detachment therefrom, the end of the spout 7, as shown in FIG. 2, may be cut obliquely at an acute angle to the axis of the spout 7. In consideration of corrosion resistance, a material for the spout 7 fitted to the pipe end may preferably be a stainless steel such as the "18-8" austenite type, "13" chromiun ferrite type, martensite type, "18" chromium ferrite type, high-chromium ferrite type, dual-phase austenite/ferrite type or the like, which is normally used for the inner surface of the polymerization vessel.

The present invention is applicable to known polymerization apparatuses which, as well as, the charging pipe, the monomeric gas recovery pipe and the reflux condenser described above, can be provided with for example, an agitator, baffles, a jacket, a coil, and the like. The agitator may comprise for example, stirring blades of paddle type, Pfaudler type, Brumagin type, propeller type or turbine type, which may be used optionally in combination with baffles such as flat plate, cylindrical or hair pin coil type baffles.

There is no particular restriction on the type of the reflux condenser, and a normal shell-and-tube type reflux condenser may be used. The reflux condenser preferably has a heat transfer area of not less than 60 m$^2$ for a polymerization vessel with an internal volume of not less than 40 m$^3$ and more particularly not less than 80 m$^3$. The reflux condenser may be connected to the polymerization vessel by means of one pipe through which both vapor and liquid are passed, or by two pipes with one for vapor and the other for liquid. Preferably connection is by means of one pipe. With the reflux condenser connected by one pipe, both gaseous monomer passing from the polymerization vessel to the condenser and condensed liquid monomer returning from the reflux condenser to the polymerization vessel pass through the same pipe. With the reflux condenser connected by two pipes, the pipe through which the gaseous monomer passes to the reflux condenser is separate from the pipe through which the condensed monomer returns to the polymerization vessel.

In polymerization of a monomer having an ethylenically unsaturated double bond using the polymerization vessel of the present invention, various known technologies for preventing polymer scale deposition can be applied at the same time. Preferably these involve precoating a known polymer scale preventive agent to form a coating film thereof on the inner wall surface of a polymerization vessel, and optionally on other parts with which a monomer comes into contact during polymerization. This formation of the coating film of such a polymer scale preventive agent prevents the polymer scale deposition.

The polymer scale preventive agent may include, for example, a dyestuff, a pigment, a water-soluble polymer, a nitrite, a nitrogen-containing aromatic compound, a heterocyclic compound, an iodine compound, a pyrogallol derivative, a phenolic compound, an aromatic amine compound or the like, and specifically includes those described in Japanese Patent Publication (KOKOKU) Nos. 46-16084 (1971), 45-30343 (1970), 46-4753 (1971), 45-37988 (1970), 46-20821 (1971), 45-30835 (1970), 48-29795 (1973), 51-21672 (1976), 51-37306 (1976), 51-37308 (1976), 51-24953 (1976), 53-6023 (1978), 53-6024 (1978), 53-6025 (1978), 53-6026 (1978), 53-21908 (1978), 53-28347 (1978), 53-28348 (1978), 53-46235 (1978), 59-1413 (1984), 58-13564 (1983), 56-5442 (1981), 56-5443 (1981), 56-5444 (1981), 59-34721 (1984), 58-11884 (1983), 60-6361 (1985), 59-31522 (1984), 60-48522 (1985), 60-48523 (1985), 51-1471 (1976), 51-1472 (1976), 57-59243 (1982), 55-5523 (1980), 56-22445 (1981), 56-22447 (1981), 57-31730 (1982), 57-47922 (1982), 60-59246 (1985), 61-25730 (1986), 52-24070 (1977), 55-4327 (1980), 58-12893 (1983), 58-14444 (1983), 58-14445 (1983), 58-14446 (1983), 58-14447 (1983), 60-42245 (1985), 61-21247 (1986), 61-842 (1986), 61-843 (1986), 49-2992 (1974), 53-36509 (1978), 57-34286 (1982), 60-40444 (1985), and 60-59247 (1985); and Japanese Pre-examination Patent Publication (KOKAI) Nos. 57-195702 (1982), 57-198710 (1982), 58-11504 (1983), 58-180509 (1983), 58-180510 (1983), 59-78210 (1984), 60-20909 (1985), 54-50089 (1979), 54-101889 (1979), 55-21436 (1980), 55-73709 (1980), 55-98207 (1980), 55-112209 (1980), 58-8709 (1983), 58-61104 (1983), 58-168607 (1983), 58-180511 (1983), 58-204006 (1983), 60-71614 (1985), 55-54305 (1980), 55-54317 (1980), 57-192413 (1982), 57-192414 (1982), 59-129207 (1984), 61-7309 (1986), 53-108187 (1978), 59-184202 (1984), 59-202201 (1984), 59-210902 (1984), 60-47002 (1985), 60-71601 (1985), 60-72902 (1985), 60-96603 (1985), 60-233103 (1985), 61-31406 (1986), 61-34006 (1986), 61-51001 (1986), 61-51002 (1986), 55-155001 (1980), 55-155002 (1980), 56-112903 (1981), 58-69203 (1983), 58-101103 (1983), 58-103503 (1983), 58-210902 (1983), 59-11303 (1984), and 59-170102 (1984).

Furthermore the present invention provides a process capable of producing a polymer of a high quality which effectively prevents polymer scale deposition, using the above-described polymerization apparatus.

Thus, the present invention also provides a process of producing a polymer which comprises polymerizing a monomer having an ethylenically unsaturated double bond in an aqueous medium, using the above-described polymerization vessel, wherein the quantity of heat removed by the reflux condenser is increased stepwise or continuously with progress of the polymerization from initiation thereof, such that not less than 20% of the total reaction heat generated during the whole course of the polymerization is removed by the reflux condenser.

Average rate of heat generation (hereinafter referred to as average heat generation rate) is herein defined by the following equation: Average rate of heat generation (kcal/hr)= Total quantity of reaction heat generated during the whole course of polymerization (kcal)÷polymerization time (hr)

Preferably, in the process above, the quantity of heat removed by the reflux condenser is increased at a rate of not more than 30%, more preferably 10 to 25%, on average of the average heat generation rate. Preferably, the quantity of the heat removed is increased continuously. If the quantity of heat removed by the reflux condenser is increased too rapidly from the initial stage of polymerization, bubbles of a suspended polymerization liquid containing a large amount of a polymerization initiator are formed by bumping and rise to the gaseous phase region of the polymerization vessel so that polymer scale is liable to be deposited on the inner wall surface thereof. For example, in the suspension polymerization of vinyl chloride, the liquid monomer is liable to rise to the upper gaseous phase region of the vessel due to the presence of a large amount of liquid monomer of lower specific gravity than water at the initial stage of polymerization. However, since with progress of the polymerization the monomer is converted into a polymer having a higher specific gravity, there is not the same tendency for the liquid monomer to rise. The operation according to the process of the present invention is thus effective in preventing polymer scale deposition.

The process of the present invention is particularly effective when a polymerization vessel has an internal volume of not less than 40 $m^3$, with heat removal being highly dependent on the reflux condenser. With such a polymerization vessel, preferably the quantity of heat removed by the reflux condenser is controlled to be not more than 10%, and more preferably 0%, of the average heat generation rate when a polymerization conversion is less than 5%; less than 28% of the average heat generation rate when the polymerization conversion is more than 5% but less than 30%; and from 28% to 80% of the average heat generation rate when the polymerization conversion is more 30%; with the quantity of heat removed by the reflux condenser being increased continuously or stepwise. Furthermore, the quantity of heat removed by the reflux condenser is controlled to be not less than 20%, and preferably from 20% to 50% of the total reaction heat generated during the whole course of the polymerization.

The monomer having an ethylenically unsaturated double bond which is polymerized according to the present invention may include, for example, vinyl halides such as vinyl chloride; vinyl esters such as vinyl acetate, and vinyl propionate; acrylic acid, methacrylic acid, and their esters or salts; maleic acid, fumaric acid, and their esters or anhydrides; diene monomers such as butadiene, chloroprene, and isoprene; styrene; acrylonitrile; vinylidene halides; vinyl ethers; or the like. These monomers may be used either singly or in combination of two or more.

Among the monomers above, the polymerization vessel of the present invention is particularly effective in polymerizing vinyl chloride either singly, or as a monomer mixture containing vinyl chloride as the main component (normally in an amount of 50% by weight or more) and a comonomer copolymerizable therewith. The comonomer(s) copolymerizable with vinyl chloride may be, for example, vinyl esters such as vinyl acetate, and vinyl propionate; acrylic esters or methacrylic acid esters such as methyl acrylate, and ethyl acrylate; olefins such as ethylene, and propylene; maleic anhydride; acrylonitrile; styrene; vinylidene chloride or the like.

When a vinyl chloride polymer is produced in the present polymerization vessel, the method and ratio of charging thereinto an aqueous medium, a monomer such as vinyl chloride, a polymerization initiator, a dispersant, etc., as well as other polymerization conditions, may be the same as known hitherto. In the polymerization, it is optional, as required or desired, to add a polymerization modifier, a chain transfer agent, a pH regulator, a gelation modifier, an antistatic agent, a cross-linking agent, a stabilizer, a filler, an antioxidant, a buffer and the like which may be suitably used to produce a vinyl chloride polymer.

EXAMPLES

Example 1

Polymerization was conducted in a stainless steel polymerization vessel having an internal volume of 80 $m^3$, and which was equipped with a water jacket, a reflux condenser, a charging pipe, a recovery pipe for monomer gas, and an agitator and baffles. The pipes for charging and other purposes fitted to the polymerization vessel were of a conventional type, with the ends thereof worked to be substantially flush with the inner wall of the polymerization vessel. Pipe-shaped spouts, as shown in FIG. 2 were attached to the ends of the liquid-return pipe from the reflux condenser, the charging pipes, and the monomer gas recovery pipe. As a polymer scale preventive agent, 10 g of C.I. Direct Blue 1 and 2 g of C.I. Basic Blue 12 were dissolved in 10 liters of deionized water, and 17 g of phytic acid was then added to form a solution. The resultant solution was coated over all the inner surfaces of the polymerization vessel, the agitating blades, the baffles and the pipes, and was then dried at 50° C. for 10 minutes and finally rinsed with water.

Subsequently, the polymerization vessel was charged with an aqueous solution consisting of 37,000 kg of deionized water, 9,200 g of a partially saponified polyvinyl alcohol, and 3,900 g of cellulose ether. After evacuation to 50 mm Hg, the polymerization vessel was further charged with 29,000 kg of vinyl chloride monomer, followed by 17,400 g of di-2-ethylhexyl peroxydicarbonate which was pumped in with stirring. Hot water was passed through the water jacket of the polymerization vessel to raise the temperature of the mixture therein to 57° C. to thus initiate reaction. During progress of the reaction cooling water was passed through the water jacket and the reflux condenser so as to remove heat. The reflux condenser was operated under the conditions, shown in Table 1. Polymerization was judged to have terminated when the internal pressure of the polymerization vessel had fallen to 6.5 kg/cm$^2$G. At this point, polymerization conversion was 85% and polymerization time was 5 hr. After completion of polymerization, unreacted monomer was recovered, and the resultant polymer taken out in the form of a slurry. The inside of the polymerization vessel was then washed with water. The above-described operation, from coating of the polymer scale preventive agent, through polymerization, to final washing of the inside of the polymerization vessel was repeated 100 times successively, and the state of deposition or growth of polymer scale in the polymerization vessel was observed. The results are given in Table 1.

The average rate of heat generation was calculated to be 1.81×10$^6$ kcal/hr as follows:

[Total quantity of vinyl chloride monomer charged] × [Quantity of polymerization reaction heat per kg of vinyl chloride monomer] × [Polymerization conversion] ÷ [Polymerization time] = 29,000 kg × 368 kcal/kg × 0.85 ÷ 5 hr.

The polymer obtained in the 100th batch was tested for bulk specific gravity, particle size distribution and fish eyes, according to the methods shown below. The results are given in Table 1.

(1) Bulk specific gravity:
 Measured according to JIS K 6721.
(2) Particle size distribution:
 Screened with sieves of #48, #60, #80, #100, #150 and #200 according to JIS Z 8801, to determine undersize amounts (% by weight).
(3) Fish eyes:
 100 parts by weight of the resultant vinyl chloride polymer obtained was mixed with 1 part by weight of tribasic lead sulfate, 1.5 parts by weight of lead stearate, 0.2 parts by weight of titanium oxide, 0.1 parts by weight of carbon black and 50 parts by weight of dioctyl phthalate. The mixture obtained was kneaded at 145° C. for 5 min with a roll mill and then formed into a sheet 0.2 mm thick. The number of fish eyes in the sheet per 100 cm$^2$ was then counted.

Comparative Example 1

In the Comparative Example 1, a polymer was produced in the same manner as in Example 1 except that the polymerization vessel was used without attaching the pipe-shaped spouts to the ends of the charging pipes, the liquid-return pipe from the reflux condenser and the recovery pipe for unreacted monomer gas. As with Example 1, the state of polymer scale deposition in the polymerization vessel was observed, and the bulk specific gravity, particle size distribution and fish eyes of the resultant polymer measured. The results are given in Table 1.

Comparative Example 2

In Comparative Example 2, a polymer was produced in the same manner as in Example 1 except that the operating conditions of the reflux condenser were changed as shown in Table 1. As with Example 1, the state of polymer scale deposition in the polymerization vessel was observed, and the bulk specific gravity, particle size distribution and fish eyes of the resultant polymer measured. The results are given in Table 1.

TABLE 1

|  |  | Example 1 | Comp. Example 1 | Comp. Example 2 |
| --- | --- | --- | --- | --- |
| Bulk specific gravity |  | 0.525 | 0.519 | 0.497 |
| Particle | #48 | 100 | 99.0 | 99.3 |
| size | #60 | 100 | 98.7 | 99.1 |
| distribution | #80 | 60.8 | 59.2 | 60.2 |
| (undersize, | #100 | 40.1 | 36.1 | 39.8 |
| % by weight) | #150 | 26.2 | 25.3 | 26.0 |
|  | #200 | 0.9 | 1.1 | 1.0 |
| Fish eyes (number) |  | 2 | 50 | 100 |
| State of polymer scale deposition in polymerization vessel |  | Thinly deposited on the inner wall in the gas phase part and around the interface of the gas/liquid phases | Thickly deposited in strip form on the inner wall extending from the liquid-return pipe opening to the bottom of the polymerization vessel. Deposited also from the openings of pipes | Thickly deposited in strip form on the inner wall extending from the liquid-return pipe opening to the bottom of the polymerization vessel. Deposited also around the interface of the |

TABLE 1-continued

|  |  | Example 1 | Comp. Example 1 | Comp. Example 2 |
|---|---|---|---|---|
| Quantity of heat removed by the condenser | Polymerization conversion: less than 5%. | 0 kcal/hr | for charging and monomer recovery to the middle of the liquid phase part. 0 kcal/hr | gas/liquid phases. 0.1 × 10$^6$ kcal/hr |
|  | Polymerization conversion: 5% or more but less than 30%. | While the polymerization conversion increased from 5% to 30%, quantity of heat removed by the condenser was raised from 0 kcal/hr to 0.5 × 10$^6$ kcal/hr continuously at a rate of 18% of the average heat generation rate. | While the polymerization conversion increased from 5% to 30%, quantity of heat removed by the condenser was raised from 0 kcal/hr to 0.5 × 10$^6$ kcal/hr continuously at a rate of 18% of the average heat generation rate. | When the polymerization conversion reached 5%, quantity of heat removed by the condenser was raised from 0.1 × 10$^6$ kcal/hr to 0.8 × 10$^6$ kcal/hr at a rate of 70% of the average heat generation rate continuously and kept at this level. |
|  | Polymerization conversion: 30% to 85% | While the polymerization conversion increased from 30% to 85%, quantity of heat removed by the condenser was raised from 0.5 × 10$^6$ kcal/hr to 1.25 × 10$^6$ kcal/hr continuously at a rate of 17% of the average heat generation rate. | While the polymerization conversion increased from 30% to 85%, quantity of heat removed by the condenser was raised from 0.5 × 10$^6$ kcal/hr to 1.25 × 10$^6$ kcal/hr continuously at a rate of 17% of the average heat generation rate. | Quantity of heat removed by the condenser was kept at 0.8 × 10$^6$ kcal/hr. |
| Percentage of heat removed by the condenser to the whole polymerization heat |  | 25% | 25% | 18% |

Remarks: The percentage of the quantity of heat removed by the condenser with respect to the average heat generation rate in Table 1 are given as follows.

| Heat removed by the Condenser | Percentage |
|---|---|
| 0.5 × 10$^6$ kcal/hr | 28% |
| 1.0 × 10$^6$ kcal/hr | 55% |
| 1.25 × 10$^6$ kcal/hr | 69% |

What is claimed is:

1. A polymerization apparatus for polymerizing a monomeric compound to produce a polymeric compound, comprising a polymerization vessel, a reflux condenser installed outside said polymerization vessel for removing heat by condensing a gaseous part of said monomeric compound to form a liquid condensate, and a pipe connected between said reflux condenser and a wall of said polymerization vessel with an end thereof opening into a gaseous phase region inside said polymerization vessel, for returning said liquid condensate to the polymerization vessel, wherein said end projects from an inner surface of said wall of said polymerization vessel into said gaseous phase region, and wherein said gaseous part of said monomeric compound passing from said polymerization vessel to said reflux condenser and said liquid condensate returning from said reflux condenser to said polymerization vessel both pass through said pipe between said reflux condenser and said wall of said polymerization vessel.

2. The polymerization apparatus of claim 1, wherein said polymerization vessel further comprises at least one pipe, other than said pipe from the reflux condenser, which is connected from outside of said polymerization vessel to said gaseous phase region inside said polymerization vessel, with an end thereof opening into said gaseous phase region and projecting from the inner wall surface of said polymerization vessel into said gaseous region phase region.

3. The polymerization apparatus of claim 1, wherein said polymerization vessel has a coating film of a polymer scale preventive agent on the inner wall surface thereof.

4. The polymerization apparatus of claim 1, wherein said polymerization vessel has an internal volume of not less than 40 m$^3$.

* * * * *